United States Patent Office 3,215,759
Patented Nov. 2, 1965

3,215,759
POLYMERIC MATERIALS STABILIZED WITH ALKENOYLAMINO BENZOPHENONES
Jerry Peter Milionis, Franklin Township, Somerset County, Ralph Arthur Coleman, Middlesex, and Frank Joseph Arthen, Franklin Township, Somerset County, N.J., assignors to American Cyanamid Company, Stamford, Conn., a corporation of Maine
No Drawing. Original application Jan. 13, 1960, Ser. No. 2,130, now Patent No. 3,120,564, dated Feb. 4, 1964. Divided and this application Oct. 16, 1962, Ser. No. 230,988
5 Claims. (Cl. 260—870)

This application is a division of application Serial No. 2,130, filed January 13, 1960, now Patent No. 3,120,564.

This invention relates to new polymeric materials. More specifically also, this invention relates to polymeric materials comprising (1) polymers from the polymerization of compounds having a polymerizable $CH_2=C<$ group and (2) at least 0.01% by weight of the above products, and also to polymerizable compositions therefor.

The field of resin additives has seen in the past few years, the development of a new type of additive, namely the ultraviolet absorber. These are compounds which selectively absorb incident ultraviolet light and emit the energy in the form of heat or sometimes visible light. They consequently protect the resin material from photo-decomposition.

A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbency in the desired wave length range. However, for the most desirable ultraviolet light protection, the high absorbency should be at those wave lengths sufficiently below the visual range so that the compound has no yellow color visually.

A further deficiency of commercial UV absorbers is that many show a tendency to be leached out of plastics by solvents or to be lost by evaporation during the hot molding and other heat treatments to which the plastics may be subjected. Not only does this cause a loss of protection, but also there are uses in which loss by leaching is especially undesirable. Among these is the protection of transparent plastic packages for food from discoloration. It is highly undesirable, e.g., for a plastic bag for an oleaginous food to have an ingredient which the oil in the food will dissolve out of the bag. Such containers are usually not approved for use with food. Other uses where such leaching is deleterious include plastic dishes and utensils as well as containers.

More recently there has been suggested ultraviolet absorbers which contain copolymerizable groups. The original classes of ultraviolet absorbers were usually hydroxyalkoxy derivatives of benzophenone and, more recently, benzotriazoles. The first suggestions of copolymerizable groups have been to replace the alkoxy group with an alkenyloxy or to place an alkenyl group on the ring of a benzophenone. These compounds have been found to copolymerize and to give protection to plastics in which they form, in small amounts, one of the comonomers. However, the copolymerization efficiency of such compounds has proved to be wholly inadequate. Very seldom do more than 15% of the alkenyloxy benzophenones actually become part of the polymeric chain. The remainder of the material added is easily leached out by solvent extraction. Since these compounds are expensive, such an inefficient copolymerization results in very expensive protection and it is often cheaper to use the conventional ultraviolet absorber which is a mere additive and not a comonomer.

We have found that 2-hydroxybenzophenones which carry, on one or the other rings of the benzophenone, an alkenoylamino substituent, are efficient comonomers and, as such, provide extraordinary protection, from incident ultraviolet light, to polymeric materials in which it is copolymerized. The 2-hydroxybenzophenones which form our invention are described and claimed in the copending application named above. The copolymers of polymerizable ethylene compounds containing a $CH_2=C<$ polymerizable group with compounds of the above description are polymers of extraordinary stability to ultraviolet light.

The new alkenoylamino-benzophenones can be incorporated in resins and plastics like any other UV absorber to give good protection. However, an especially important feature of our invention lies in their ability to copolymerize well with the monomers for the various plastics and thus become an integral part of the resultant resin molecule. Such copolymerization can be carried out with any monomer containing ethylenic double bonds, such as ethylene, propylene, butylene, styrene, methyl styrene, ethyl styrene, propyl styrene, etc., acrylic acid and its esters and amides, methacrylic acid and its esters and amides, acrylonitrile, vinyl esters such as vinyl acetate and chloride, vinyl ethers such as vinyl butyral, dienes such as butadiene, isoprene, and chlorobutadiene, and such compounds.

They can also be included with unsaturated modifiers of polyester resins such as described in U.S. Pat. No. 2,255,313, U.S. Pat. No. 2,443,735, U.S. Pat. No. 2,443,736, U.S. Pat. No. 2,443,737, U.S. Pat. No. 2,443,739, U.S. Pat. No. 2,443,740 and U.S. Pat. No. 2,443,741, all of which patents are specifically incorporated therein by reference. Such resins are prepared from unsaturated polyester resins prepared from alpha, beta unsaturated poly carboxylic acids such as maleic, fumaric, aconitic, itaconic, monochloro maleic anhydride, and the like. These unsaturated acids are usually present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use such as oxalic, malonic, succinic, glutaric, sebacic and chlorinated polycarboxylic acids such as tetrachlorophthalic anhydride, hexachloroendomethylene tetrahydrophthalic acid, and the like, but preferably in amounts less than a larger proportion of the total amount of polycarboxylic acid present.

Whenever available, the anhydrides of these acids may be used, or mixtures of the acids or mixtures of the anhydrides thereof.

As polyhydric alcohols which may be used to prepare the unsaturated polyesters, it is preferred to make use of those alcohols having only two hydroxy groups although minor amounts of alcohols having three hydroxy groups, four hydroxy groups, or more hydroxy groups, may be used in minor amounts. As dihydroxy alcohols, one could use ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6, and the like. Additionally, one could use glycerol, pentaerythritol, dipentaerythritol, and the like. The esterification of the alcohol is carried out until the Acid Number of the mixture has been reduced below 55.

The modifier for polyester resins is usually a polymerizable material having a $CH_2=C<$ group. Amongst these polymerizable compounds are styrene, side chain substituted styrenes such as the alpha methylstyrene, alpha ethylstyrene, and the like, or ring substituted styrene such as ortho, meta and para-alkyl styrenes such as o-methyl styrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxy-isobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

The modifier is used in a ratio of from 10 to 90 parts of polyester up to 60 parts to 40 parts of polyester. Preferably 25 to 35 parts of modifier is used to 65 to 75 parts of polyester.

The above-defined alkenoylamino-benzophenones can also be included with advantage in styrenated oil modified alkyd resins, in place of or in addition to the styrene. Such resins, which are extensively used in coatings, are very well described in U.S. Pat. No. 2,713,039, U.S. Pat. No. 2,748,092 and U.S. Pat. No. 2,851,431, which are expressly incorporated herein by reference for the purpose of such disclosure. These resins are essentially the reaction products of drying oils and phthalic anhydride with polyhydric alcohols, modified by reaction with styrene. The styrenation can take place before or after esterification of the acids by the alcohols or at intermediate stages. The new monomers of our invention are reacted at the same stages, just like the styrene, as desired.

The usage of unsaturated amides of our invention in the copolymers of our invention is usually small. A minimum of 0.01% by weight should be in the copolymer. Amounts of 0.5 to 2.0% are preferred. For special uses much larger amounts, sometimes as much as 20% can be used.

It is an advantage of the new monomers of our invention that they are copolymerized much more effectively with other ethylenic monomers and polymers than polymerizable ultraviolet absorbers heretofore known. It is an advantage of the polymers of our invention that they show much greater stability to deterioration from ultraviolet light than do polymers heretofore known and that this stability can be retained through all kinds of treatment such as hot molding and even through contact with solvents which, in the past, extracted the conventional ultraviolet absorber from the polymeric composition.

Our invention can be illustrated by the following examples in which parts are by weight unless otherwise specified.

*Example 1*

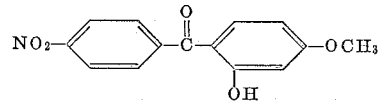

p-Nitrobenzoylchloride (90.8 parts), m-dimethoxybenzene (69 parts) and monochlorobenzene (333.2 parts) are mixed and cooled to 15° C. Aluminum chloride (84 parts) is added gradually while maintaining the temperature below 15° C. The mixture is then stirred at 10° for a short period. It is then gradually allowed to warm to 25° C. after which it is heated on a steam bath at 90° C. until the reaction is complete. The mixture is then drowned in ice water (700 parts) and the drowned mixture is heated on a steam bath to decompose the complex. It is then allowed to cool and the crystals which form are filtered off, recrystallized from a mixture of 1224 parts of alcohol and 219.75 parts of benzene, filtered and dried.

*Example 2*

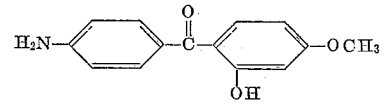

2-hydroxy-4-methoxy-4'-nitrobenzophenone (25 parts), glacial acetic acid (104.98 parts), and 10% palladium on charcoal (about 0.1 part) are placed in a hydrogenation autoclave. Hydrogen is run to 40 lb. pressure and the clave is shaken until a pressure drop of about twenty-three pounds occurs. The mixture is then heated on the steam bath, treated with acetone (79.2 parts), filtered, and the filtrate drowned in water (500 parts). The yellow solid which forms is filtered, washed with water, oven dried at 50° C. and recrystallized from alcohol to yield 4'-amino-2-hydroxy-4-methoxybenzophenone.

*Example 3*

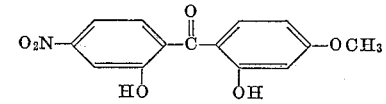

The procedure of Example 1 is repeated using an equivalent quantity of p-nitrosalicyloyl chloride in place of the p-nitrobenzoylchloride. The p-nitrosalicyloyl chloride may be prepared by heating p-nitrosalicylic acid with excess thionyl chloride using a small amount of pyridine as a catalyst.

*Example 4*

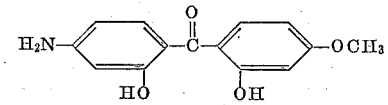

The procedure of Example 2 is followed using as starting material the product of Example 3.

*Example 5*

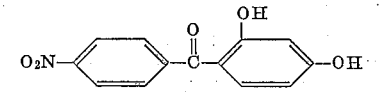

p-Nitrobenzoic acid (167 parts), resorcinol (110 parts), and monochlorobenzene (1000 parts) are slurried and heated to 50° C. Heating is discontinued and boron trifluoride (136 parts) is added. The temperature is raised to 90–100° C. and the mixture is stirred at this temperature until reaction is substantially complete. The mixture is drowned in a solution consisting of sodium acetate (200 parts) and water (1000 parts) and stirred a short while at 90–100° C. The solvent is removed by steam distillation. The residue is cooled and recrystallized from benzene.

*Example 6*

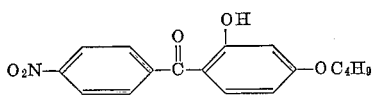

2,4-dihydroxy-4'-nitrobenzophenone (204 parts), butyl bromide (150 parts), sodium carbonate (53 parts), 95% alcohol (1000 parts) and water (300 parts) are stirred and refluxed until the reaction is substantially complete. The mixture is cooled and drowned in water. The solid which forms is filtered and recrystallized from 95% alcohol.

If, in place of butyl bromide in the above procedure, other alkyl bromides are used, e.g. octyl, dodecyl, and octadecyl bromides, one obtains the corresponding alkoxy benzophenones.

*Example 7*

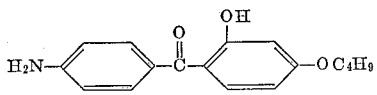

By reduction of the product of Example 6 using the procedure similar to that described in Example 2, 2-hydroxy-4-butoxy-4-aminobenzophenone is obtained.

Corresponding homologous products are obtained by a similar procedure.

*Example 8*

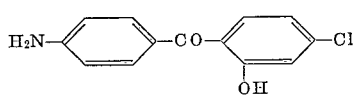

The procedure of Example 1 is followed using an equivalent quantity of m-chloranisole in place of the dimethoxybenzene. The product is reduced by the procedure of Example 2.

Similarly, the use, instead of m-chloranisole, of m-methylanisole and m-bromoanisole in this procedure results in the correspondingly substituted product.

*Example 9*

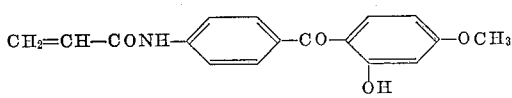

A slurry of 3.16 parts of the product of Example 2 in 75 parts by volume of monochlorobenzene is added in small portions to 1.18 parts of acrylyl chloride in 25 parts by volume of monochlorobenzene, to which 1.19 parts of pyridine and 0.1 part of hydroquinone have been added. The temperature of addition is −5 to 0° C. The mixture is stirred at this temperature for a short time and then at room temperature (25–30° C.) until the reaction is substantially complete. Recrystallization from alcohol and water and then from mono-chlorobenzene yields a yellow solid.

*Example 10*

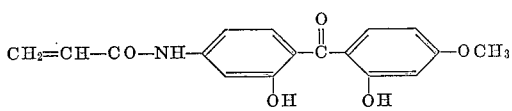

The procedure of Example 9 is followed using an equivalent quantity of the product of Example 4 in place of that of Example 2.

*Example 11*

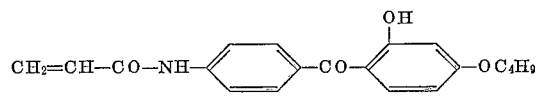

The procedure of Example 9 is followed using an equivalent quantity of the product of Example 6 in place of the product of Example 2.

*Example 12*

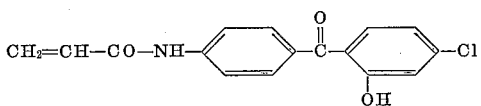

The procedure of Example 9 is followed using the 2-hydroxy-4-chloro-4'-aminobenzophenone prepared in Example 8 in amounts equivalent to the usage in Example 9 of hydroxy methoxybenzophenone. Similarly, when the other substituted benzophenones described in Example 8 are used, the correspondingly substituted benzophenone is obtained.

*Example 13*

A mixture of 9 parts of styrene and about 1 part of the compound of Example 9 is heated in the presence of 0.1 part of benzoyl peroxide as a catalyst at 80° C. for about 8 hours and 100° C. for about 72 hours in a closed container.

The resulting copolymer is added to benzene and, after complete solution, it is precipitated by the addition of an excess of ethanol. After removal it is further extracted with ethanol to remove unreacted benzophenone compound from the formed copolymer.

*Example 14*

0.5 gram of the product of Example 11 and 0.05 gram of benzoyl peroxide are placed in a Pyrex tube. 4.5 grams of styrene are added. The tube is flushed with nitrogen and then sealed. The mixture is heated at 120° C. for 100 hours. The copolymer is dissolved in toluene and precipitated in an excess of alcohol. It is then given several washings with hot alcohol. Analysis shows that the major portion of the product of Example 11 has copolymerized with the styrene.

A small amount of the copolymer is dissolved in hot toluene. This solution is brushed on a white pine panel. A very thin film is formed on the surface of the wood. A control sample is prepared by dissolving polystyrene in hot toluene and brushing this solution on a white pine panel. These two panels, along with a third panel which has no overcoating, are exposed in a Fade-Ometer for 14 hours. Both control samples become badly discolored, while the sample containing the UV absorbing copolymer shows only a slight discoloration.

*Example 15*

1 part of the copolymer described in Example 14 is milled with 49 parts of polystyrene. Chips, 50 mils thick, are molded and exposed in the Fade-Ometer along with control chips. After 100 hours' exposure the control shows considerably more yellowing as measured on a differential colorimeter.

*Example 16*

A mixture of 95 parts of a resin mixture comprising a polyester of excess propylene glycol with equal mole quantities of phthalic and maleic anhydrides, blended with 50% of its weight of styrene, 4.75 parts of additional styrene, 0.25 part of the product of Example 11 and 0.50 part of benzoyl peroxide is poured into a mold made of glass plates and cured in an oven for 30 minutes at 80° C., 30 minutes at 105° C. and 1 hour at 120° C. The product is an ultraviolet light resistant resin composition.

Example 17

A solution of 2.4 parts of dihexyl sodium sulfosuccinate and 0.13 part of sodium bicarbonate in 165 parts of deionized water is heated to 90° C. while maintaining a nitrogen atmosphere. There is then added gradually 36 parts of acrylonitrile, 74 parts of styrene and 10 parts of the monomer from Example 11. At the same time there is added 2.4 parts of $(NH_4)_2S_2O_8$ in 15 parts of water, in several portions. After the reaction is complete, excess acrylonitrile and styrene are removed by steam distillation. The polymer is coagulated, washed and dried. This polymer is used in conjunction with alkyd resins to form surface coatings.

2.5 parts of the above tripolymer is milled into 97.5 parts of styrene-acrylonitrile (84:36) copolymer and molded into 50 mil chips. These, along with unmodified styrene acrylonitrile (84:36) chips, are exposed in the Weatherometer. The control becomes discolored while the material containing the UV absorbing comonomers shows little change.

Example 18

A mixture of 4 parts of $(NH_4)_2S_2O_8$, 12 parts of sodium cetyl sulfate and 800 parts of water is adjusted to pH of 8 with sodium hydroxide. Nitrogen is bubbled through the solution for a short time. Then 320 parts of butyl methacrylate and 80 parts of the product of Example 11 are added and a slow stream of nitrogen is passed over the surface. The temperature is raised to 55° C. and maintained there until the reaction is substantially complete. The polymer is separated by freezing the latex and is washed with water and dried at 45° C. This copolymer, in combination with ethyl cellulose or nitrocellulose, can be used as a wood finishing lacquer or as a coating for fabric.

We claim:

1. A copolymer of (a) an ethylenically unsaturated monomer and (b) at least 0.01% by weight of a compound of the formula:

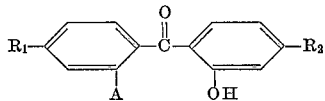

wherein A is a member selected from the group consisting of hydrogen and hydroxyl, $R_1$ is a member selected from the group consisting of acrylylamino and methacrylylamino and $R_2$ is a member selected from the group consisting of hydrogen, alkoxy of up to eighteen carbon atoms, halogen, acrylyloxy and methacrylyloxy.

2. The composition of claim 1 wherein the monomer is an unsaturated polyester.
3. The composition of claim 1 wherein the monomer is a styrene compound.
4. The composition of claim 1 wherein the monomer is an acrylate.
5. A polymerizable composition comprising (a) an ethylenically unsaturated monomer and (b) at least 0.01% by weight of a polymerizable compound of the formula:

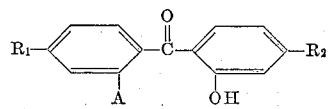

wherein A is a member selected from the group consisting of hydrogen and hydroxyl, $R_1$ is a member selected from the group consisting of acrylylamino and methacrylylamino and $R_2$ is a member selected from the group consisting of hydrogen, alkoxy of up to eighteen carbon atoms, halogen, acrylyloxy and methacrylyloxy.

References Cited by the Examiner
UNITED STATES PATENTS

| | | | |
|---|---|---|---|
| 2,937,157 | 5/60 | Clark | 260—45.95 |
| 2,938,883 | 5/60 | Raich | 260—47 |
| 3,049,503 | 8/62 | Milionis | 260—45.95 |
| 3,120,564 | 2/64 | Milionis et al. | 260—562 |
| 3,157,709 | 11/64 | Hoch et al. | 260—861 |

MURRAY TILLMAN, *Primary Examiner.*